(12) United States Patent
Rosilio et al.

(10) Patent No.: US 12,541,768 B2
(45) Date of Patent: Feb. 3, 2026

(54) SELF-LABELLING OF FRAUD RISK IN A TRANSACTION PROCESSING SYSTEM

(71) Applicant: Checkmate Network Ltd., Tel-Aviv (IL)

(72) Inventors: Israel Hanania Rosilio, Jerusalem (IL); Aviel Meir Erdis, Givatayim (IL)

(73) Assignee: Checkmate Network Ltd., Tel-Aviv (IL)

( * ) Notice: Subject to any disclaimer, the term of this patent is extended or adjusted under 35 U.S.C. 154(b) by 223 days.

(21) Appl. No.: 18/400,341

(22) Filed: Dec. 29, 2023

(65) Prior Publication Data
US 2025/0217808 A1 Jul. 3, 2025

(51) Int. Cl.
*G06Q 20/40* (2012.01)

(52) U.S. Cl.
CPC .............................. *G06Q 20/4016* (2013.01)

(58) Field of Classification Search
CPC .......................... G06Q 20/40; G06Q 20/4016
See application file for complete search history.

(56) References Cited

U.S. PATENT DOCUMENTS

| | | | |
|---|---|---|---|
| 11,316,874 B2* | 4/2022 | Lee | H04L 63/1425 |
| 2015/0348037 A1* | 12/2015 | Unser | G06Q 20/4014 705/39 |
| 2016/0071105 A1* | 3/2016 | Groarke | G06Q 50/01 705/44 |

* cited by examiner

*Primary Examiner* — Scott S Trotter
(74) *Attorney, Agent, or Firm* — FisherBroyles, LLP; Roger L. Browdy; Ronni S. Jillions (57) ABSTRACT

The presently disclosed subject matter relates to detection and mitigation of financial fraud, and in particular to implementation of systems for training machine learning models in such systems. It involves self-labelling of fraud risk in a transaction processing system.

7 Claims, 6 Drawing Sheets

SELF-LABELLING OF FRAUD RISK IN A TRANSACTION PROCESSING SYSTEM

TECHNICAL FIELD

The presently disclosed subject matter relates to detection and mitigation of financial fraud, and in particular to implementation of systems for training machine learning models in such systems.

BACKGROUND

Problems of implementation in systems of machine-learning based assessment of fraud risk have been recognized in the conventional art and various techniques have been developed to provide solutions.

GENERAL DESCRIPTION

According to one aspect of the presently disclosed subject matter there is provided a processing circuitry-based method of assigning machine learning training labels indicative of a level of risk, to accounts of a financial institution, the method comprising:
  a) identifying a first group of accounts of the financial institution as suspected of fraudulent behavior, based on degrees of matching between:
    i. account history data of each respective account, and
    ii. one or more given fraud patterns;
  b) identifying a second suspected group of accounts, the identifying comprising:
    i. for one or more accounts of the first suspected group of accounts: determining respective degrees of personally identifiable information (PII) similarity between the respective account of the first suspected group of accounts, and other accounts of the first suspected group of accounts, and
    ii. selecting accounts for which the respective determined PII similarity meets a threshold degree of PII similarity.
  c) identifying a third suspected group of accounts, the identifying comprising:
    i. for one or more accounts of the second suspected group of accounts: determining respective degrees of financial transaction activity between the respective account and other accounts of the second suspected group, and
    ii. selecting accounts for which the respective degree of financial transaction activity meets a threshold degree of financial activity.
  d) assigning a machine learning training label indicative of fraud risk to one or more accounts of the third suspected groups of accounts.

In addition to the above features, the system according to this aspect of the presently disclosed subject matter can comprise one or more of features (i) to (iv) listed below, in any desired combination or permutation which is technically possible:
  a) additionally comprising:
  e) for one or more accounts of the accounts of the financial institution:
    i. determining respective degrees of financial transaction activity between the respective account and accounts of the third suspected group of accounts, and
    ii. selecting accounts for which the respective degree of financial transaction activity meets a threshold degree of financial activity,
  thereby giving rise to a group of suspected victim accounts;
  f) for one or more accounts of the group of suspected victim accounts:
    i. determining degrees of matching between:
      account history data of the respective account, and
      one or more given fraud victim patterns; and
    ii. based on the determined respective degrees of matching:
      assigning, to the respective account, a machine learning training label indicative of fraud victim risk.
  b) the identifying the first group of accounts comprises:
  a) for one or more accounts of the financial institution: determining degrees of matching between:
    i. account history data of the respective account, and
    ii. one or more given fraud patterns;
  b) for each fraud pattern of the one or more given fraud patterns:
    a. selecting a given number of accounts, of the one or more accounts, with highest degrees of matching of the respective fraud pattern,
    b. for each of the selected accounts, compute a weighted multi-pattern degree of matching, based on the determined degrees of matching with the one or more fraud patterns; and
  c) identifying a given number of accounts with highest weighted multipattern degrees of matching as suspected of fraudulent behavior,
  the identified accounts with the highest weighted multi-pattern degrees of matching thereby constituting the first suspected group.
  c) the identifying the second suspected group of accounts comprises:
  a) utilizing a first graph, wherein:
    i. each node is an account of the first group of accounts, and
    ii. each edge is data indicative of PII shared between accounts associated with the respective edge;
  b) performing a weakly connected components (WCC) algorithm on the first graph, thereby giving rise to one or more clusters of accounts;
  c) for at least one cluster of the one or more clusters:
    i. utilizing a respective second graph, wherein each node is an account of the respective cluster, and each edge is a degree of PII similarity between accounts associated with the respective edge;
    ii. performing a node similarity algorithm on the respective second graph, thereby giving rise to respective measures of pairwise similarity for each pair of accounts in the respective cluster;
    iii. utilizing a respective third graph, wherein each node is an account of the cluster, and each edge is the respective measure of pairwise similarity between accounts associated with the respective edge; and
    iv. performing a weighted degree centrality algorithm on the respective third graph, thereby giving rise to per-account measures of similarity to all other accounts in the respective cluster;
    v. identifying accounts with measures of similarity to all other accounts which meet a similarity measure threshold, the identified accounts with measures of similarity to all other accounts which meet a similarity measure threshold thereby constituting the second suspected group.

d) wherein the identifying the third suspected group of accounts comprises, for at least one cluster of the one or more clusters:

utilizing a respective fourth graph, wherein each node is an account of the cluster, and edge is a value of a historical payment between accounts associated with the edge;
    a. performing a Louvain algorithm on the respective fourth graph, resulting in one or more clusters of accounts based on financial activity;
    b. for one or more of the resulting clusters of accounts based on financial activity, perform a weighted degree centrality algorithm, thereby resulting in, for each account in the cluster based on financial activity, a respective measure of financial transaction activity within the cluster, and
    eliminating accounts with measures of financial transaction activity that do not meet a transaction activity threshold;
    c. performing a page rank algorithm on the respective fourth graph, thereby resulting in, for each account, a ranking of influence in the cluster based on financial activity,
    the accounts with ranking of influence meeting a ranking threshold thereby constituting the third suspected group.

According to another aspect of the presently disclosed subject matter there is provided a system of assigning machine learning training labels indicative of a level of risk, to accounts of a financial institution, the system comprising a processing circuitry configured to:

a) identify a first group of accounts of the financial institution as suspected of fraudulent behavior, based on degrees of matching between:
    iii. account history data of each respective account, and
    iv. one or more given fraud patterns;

b) identify a second suspected group of accounts, the identifying comprising:
    i. for one or more accounts of the first suspected group of accounts: determining respective degrees of personally identifiable information (PII) similarity between the respective account of the first suspected group of accounts, and other accounts of the first suspected group of accounts, and
    ii. selecting accounts for which the respective determined PII similarity meets a threshold degree of PII similarity.

c) identify a third suspected group of accounts, the identifying comprising:
    i. for one or more accounts of the second suspected group of accounts: determining respective degrees of financial transaction activity between the respective account and other accounts of the second suspected group, and
    ii. selecting accounts for which the respective degree of financial transaction activity meets a threshold degree of financial activity.

d) assign a machine learning training label indicative of fraud risk to one or more accounts of the third suspected groups of accounts.

This aspect of the disclosed subject matter can further optionally comprise one or more of features (i) to (iv) listed above with respect to the method, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of assigning machine learning training labels indicative of a level of risk, to accounts of a financial institution, the method comprising:

a) identifying a first group of accounts of the financial institution as suspected of fraudulent behavior, based on degrees of matching between:
    i. account history data of each respective account, and
    ii. one or more given fraud patterns;

b) identifying a second suspected group of accounts, the identifying comprising:
    i. for one or more accounts of the first suspected group of accounts: determining respective degrees of personally identifiable information (PII) similarity between the respective account of the first suspected group of accounts, and other accounts of the first suspected group of accounts, and
    ii. selecting accounts for which the respective determined PII similarity meets a threshold degree of PII similarity.

c) identifying a third suspected group of accounts, the identifying comprising:
    i. for one or more accounts of the second suspected group of accounts: determining respective degrees of financial transaction activity between the respective account and other accounts of the second suspected group, and
    ii. selecting accounts for which the respective degree of financial transaction activity meets a threshold degree of financial activity.

d) assigning a machine learning training label indicative of fraud risk to one or more accounts of the third suspected groups of accounts.

This aspect of the disclosed subject matter can further optionally comprise one or more of features (i) to (iv) listed above with respect to the method, mutatis mutandis, in any desired combination or permutation which is technically possible.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "comparing", "encrypting", "decrypting", "determining", "calculating", "receiving", "providing", "obtaining", "emulating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processor, mitigation unit, and inspection unit therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
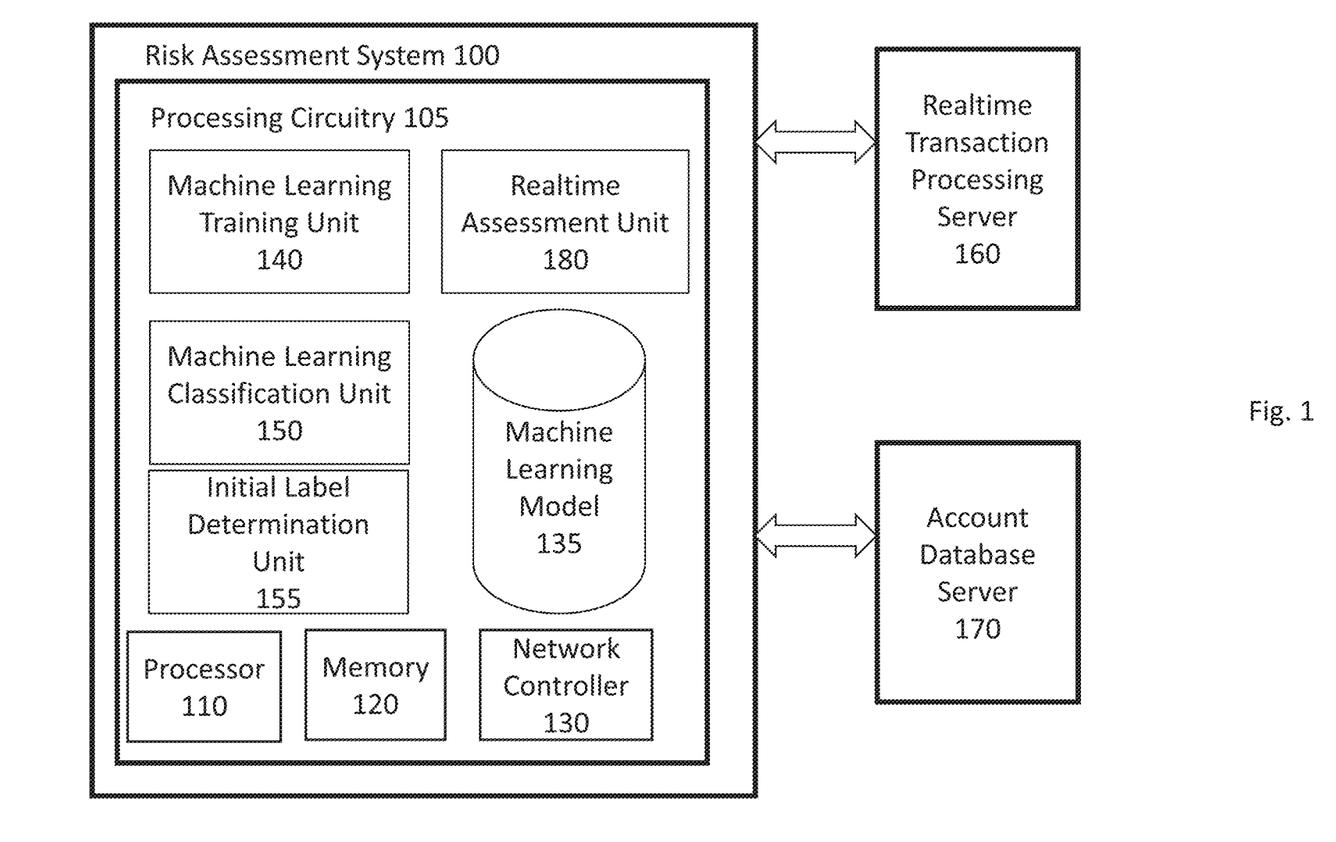
FIG. 1 illustrates an example deployment of a risk assessment system, in accordance with some embodiments of the presently disclosed subject matter.

FIG. 1 illustrates an example deployment of a risk assessment system, in accordance with some embodiments of the presently disclosed subject matter.

Realtime transaction processing server 160 can be a system that is handling financial transactions in real time. Realtime transaction processing server 160 can, for example, provide real time queries and receive realtime responses from risk assessment system 100. An example of query/response exchange appears below with reference to FIG. 2.

Risk assessment system 100 can include processing circuitry 105, which in turn can include processor 110 and memory 120.

Processor 110 can be a suitable hardware-based electronic device with data processing capabilities, such as, for example, a general purpose processor, digital signal processor (DSP), a specialized Application Specific Integrated Circuit (ASIC), one or more cores in a multicore processor, etc. Processor 110 can also consist, for example, of multiple processors, multiple ASICs, virtual processors, combinations thereof etc.

Memory 120 can be, for example, a suitable kind of volatile and/or non-volatile storage, and can include, for example, a single physical memory component or a plurality of physical memory components. Memory 120 can also include virtual memory. Memory 120 can be configured to, for example, store various data used in computation.

Processing circuitry 105 can be configured to execute several functional modules in accordance with computer-readable instructions implemented on a non-transitory computer-readable storage medium. Such functional modules are referred to hereinafter as comprised in the processing circuitry. These modules can include, for example, machine learning training unit 140, realtime assessment unit 180, machine learning classification unit 150, initial label determination unit 155, machine learning model 135, and network controller 130.

Initial label determination unit 155 can determine initial risk labels of accounts of a financial institution, as part of an initial configuration sequence, as described in detail below with reference to FIGS. 3-7. Initial label determination unit 155 can utilize, for example, bank data that is maintained in account database server 170, as described below.

Network controller 130 can communicate with e.g. realtime transaction processing server 160 and account database server 170.

Machine learning training unit 140 can receive training data and train machine learning model 105. By way of non-limiting example, Machine learning training unit 140 can perform training by utilizing account history data retrieved from account database server 170 and use initial labels computed by initial label determination unit 155 as ground truth, as described in detail below.

Machine learning classification unit 150 can classify e.g. account data using machine learning model 105, which then outputs a risk label.

Realtime assessment unit 180 can receive the realtime enquiries from realtime transaction processing server 160 and e.g. invoke machine learning classification unit 150 to receive data to provide responses.

Account database server 170 can maintain bank-specific account history data (e.g. account access data and/or account transaction data), which risk assessment system 100 can receive and utilize e.g. while performing initial label determination.

It is noted that the teachings of the presently disclosed subject matter are not bound by the entities described with reference to FIG. 1. Equivalent and/or modified functionality can be consolidated or divided in another manner and can be implemented in any appropriate combination of software with firmware and/or hardware and executed on a suitable device. The risk assessment system can be a standalone network entity, or integrated, fully or partly, with other entities. It will be clear to one skilled in the art how a risk assessment system can be employed in other embodiments.

Figure 2:
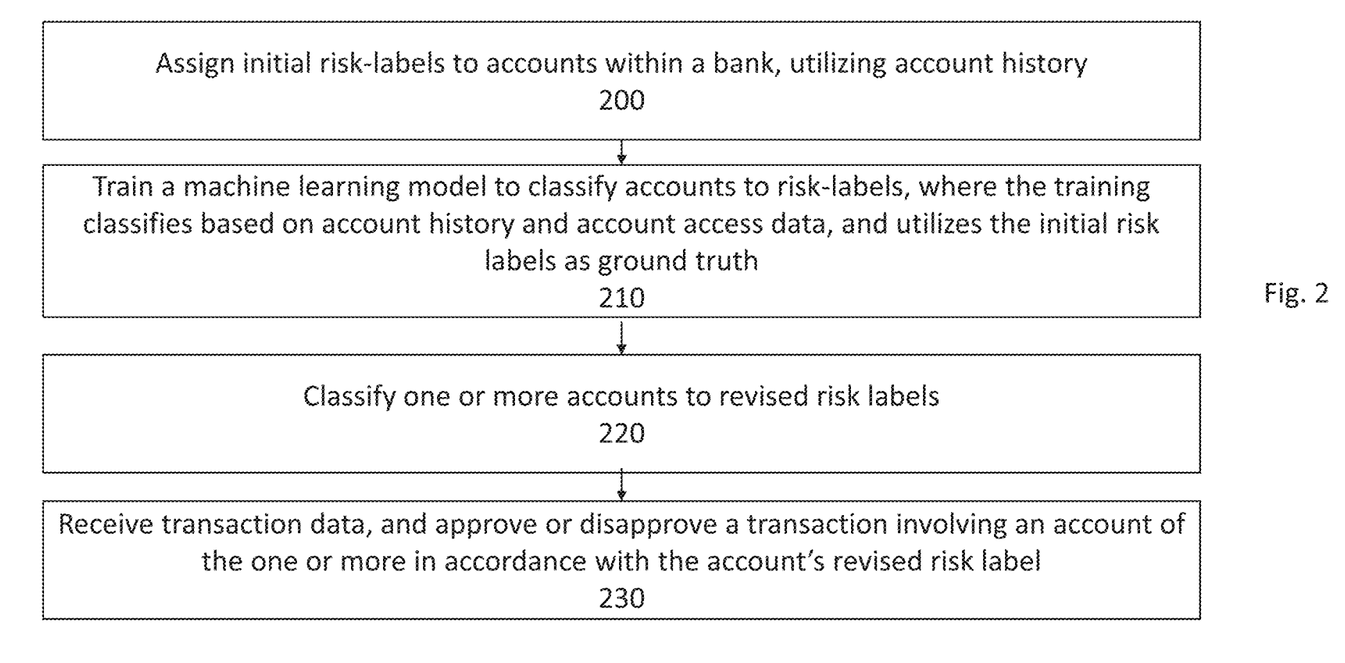
FIG. 2 illustrates a flow diagram of an example method of initializing a machine learning-based system of transaction fraud detection and then utilizing the system to allow/disallow transactions, in accordance with some embodiments of the presently disclosed subject matter.

FIG. 2 illustrates a flow diagram of an example method of initializing a machine learning-based system of transaction fraud detection and then utilizing the system to allow/disallow transactions, in accordance with some embodiments of the presently disclosed subject matter.

Processing circuitry 105 (e.g. initial label determination unit 155) can begin initialization by using account history data to assign initial risk-labels to accounts within a bank.

Determining initial risk labels of banking customers can be difficult, as typically there is no ground truth available. Accordingly, the assigning initial risk labels can be accomplished by examining account history data and interrelationships between accounts.

In particular, in some embodiments of the presently disclosed subject matter, effective identification of initial risk labels is accomplished by utilizing the large amounts of transaction and access data maintained by the financial institution, and performing large scale analysis of this data, by utilizing graphs and graph algorithms. Such methods are described in detail below, with reference to FIGS. 3-8.

After initial risk labels have been determined, processing circuitry 105 (e.g. machine learning training unit 140) can train a machine learning model 135 to classify accounts to risk-labels, where the training utilizes account history data as input to the classifier, and utilizes the determined initial risk labels as ground truth in the training.

Processing circuitry 105 (e.g. machine learning classification unit 150) can then utilize the trained machine learning model 135 to classify one or more accounts (for example: all the accounts, e.g. on a daily basis) to revised risk labels (and then e.g. store the revised risk labels in a local database (not shown)).

At this stage, the system is ready for use in transaction processing. Processing circuitry 105 (e.g. realtime assessment unit 180) can receive transaction data (e.g. from realtime transaction processing server 160), assess the transaction, and signal a response back to e.g. realtime transaction processing server 160)

By way of non-limiting example: realtime transaction processing server 160 can process a transaction involving a sender and receiver of funds. Realtime transaction processing server 160 can send an inquiry regarding the sender account and receiver account. Processing circuitry 105 (e.g. realtime assessment unit 180) can then, for example, reject the transaction is either the sender or receiver has a risk label indicative of a certain level of risk.

It is noted that the teachings of the presently disclosed subject matter are not bound by the flow chart illustrated in FIG. 2 (or by other flow charts described herein), the illustrated operations can occur out of the illustrated order. It is also noted that whilst the flow chart is described with reference to elements of the system of FIG. 1, this is by no means binding, and the operations can be performed by elements other than those described herein.

Figure 3:
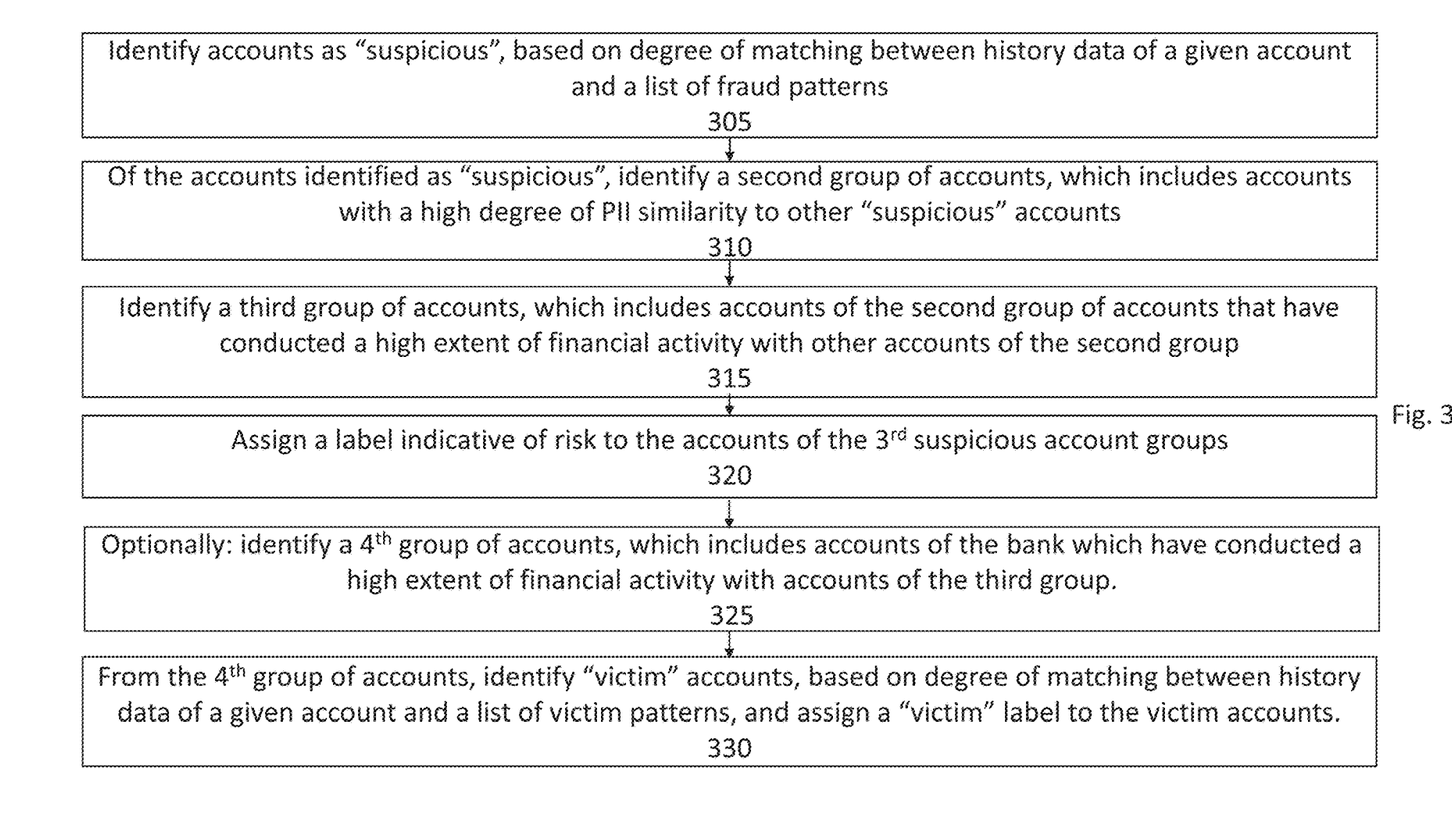
FIG. 3 illustrates a flow diagram of an example method of determining machine learning training labels of financial accounts for use in a machine learning-based risk assessment system, in accordance with some embodiments of the presently disclosed subject matter.

FIG. 3 illustrates an example method of determining machine learning training labels of financial accounts for use in a machine learning-based risk assessment system, in accordance with some embodiments of the presently disclosed subject matter.

Processing circuitry 105 (e.g. initial label determination unit 155) can begin by analyzing accounts managed by a financial institution, and can identify 305 a subset of the accounts as "suspicious"-based on degree of matching between history data of a given account and a provided list of fraud patterns.

The term "fraud pattern" is interpreted to include a behavior or series of behaviors which the financial institution has deemed to be associated with fraudulent, criminal, or otherwise undesirable behavior.

In some examples, a fraud pattern is dependent on financial transaction behavior e.g. transfers, cash withdrawals, overdraft behavior etc.

In some examples, a fraud pattern is dependent on account access behavior e.g. geographical locations of internet network addresses used for account access, characteristics of devices used for account access etc.

In some examples, a fraud pattern is dependent on combinations of the above and/or other types of account behaviors and/or account attributes.

The following are non-limiting examples of fraud patterns:

Circular transaction: a source account transfers money to another account within the bank. The money is then transferred to at least one more account (sometimes at a different bank) before coming back to the source account. If this occurs within a certain timeframe and with the original and final value of the transfer almost identical, the pattern is matched.

Rapid withdrawal of cash: if an account undergoes withdrawal of a large sum of cash within a specified time or specified number of transactions, the pattern is matched.

Network access locations: if an account is accessed within a specified timeframe from more than a given number of geographic locations, or from given combinations of geographic locations, the pattern is matched.

In some embodiments, processing circuitry 105 (e.g. initial label determination unit 155), for a given list of fraud patterns, assigns each account in the institution with a "score" of matching of the fraud patterns (for example: using methods described below with reference to FIG. 4). In such embodiments, processing circuitry 105 (e.g. initial label determination unit 155) can regard accounts whose assigned score meets a given threshold as "suspicious" and subject to further processing.

In some other embodiments, processing circuitry 105 (e.g. initial label determination unit 155) evaluates accounts' matching of the given set of fraud patterns, and then deem accounts as "suspicious" using a different method.

Accounts engaging in fraudulent behavior sometimes operate within a network of other accounts that have personal identifiable information in common.

Accordingly, processing circuitry 105 (e.g. initial label determination unit 155) can further process the accounts identified as "suspicious", by identifying 310 a group of accounts which bear a degree of similarity of personal identifiable information (PII) to other suspicious accounts.

By way of non-limiting example, personal identifiable information of an account can include:

Phone number street address internet protocol (IP) address used to access the account identifier of a cellular base station subsystem (BSS) utilized to access the account International Mobile Equipment Identity (IMEI) of device utilized to access the account In some embodiments, processing circuitry 105 (e.g. initial label determination unit 155) identifies suspicious accounts with high PII similarity to other suspicious accounts using a method described below, with reference to FIG. 5. In some embodiments, processing circuitry 105 (e.g. initial label determination unit 155) identifies suspicious accounts with high PII similarity to other suspicious accounts using another suitable method. These accounts can then constitute a second group of accounts with an associated risk.

Processing circuitry 105 (e.g. initial label determination unit 155) can next identify 315 accounts within the second group which have conducted a given degree of financial activity with other accounts of the second group. These accounts can then constitute a third group of accounts with an associated risk. In some embodiments, processing circuitry 105 (e.g. initial label determination unit 155) identifies accounts which have conducted a given degree of financial activity with other accounts within a cluster of accounts with PII similarity, as described in more detail below, with reference to FIG. 6.

Processing circuitry 105 (e.g. initial label determination unit 155) can then assign 320 machine learning training labels to one or more accounts of the third suspected group (e.g. to all of the accounts of the third suspected group).

In some embodiments, processing circuitry 105 (e.g. initial label determination unit 155) assigns one of two labels (e.g. high risk, to distinguish from other accounts that are low risk). In some embodiments, processing circuitry 105 (e.g. initial label determination unit 155) assigns a label from a group of more than two labels (e.g. a risk ranking from 0 to 4).

Optionally, processing circuitry 105 (e.g. initial label determination unit 155) can next identify possible "victim" accounts by:
a) identifying 325 accounts of the bank that have conducted a certain extent of financial transaction activity with accounts of the third group
b) determining 330 a degree of matching between account history data of one or more accounts of these identified accounts, and a list of victim patterns.

The term "victim pattern" is interpreted to include a behavior or series of behaviors which the financial institution has deemed to be associated with falling victim to fraudulent, criminal, or otherwise undesirable behavior.

In some embodiments, processing circuitry 105 (e.g. initial label determination unit 155), determines, for each account to be processed, a "score" of matching of the victim patterns. Methods used for scoring accounts for fraud patterns can similarly be used for scoring accounts for victim patterns.

Processing circuitry 105 (e.g. initial label determination unit 155) can evaluate whether an account has a degree of matching of the victim patterns that matches a victim pattern threshold, and if so can designate it as a suspected victim account. As such, processing circuitry 105 (e.g. initial label determination unit 155) can assign a particular risk label (e.g. low risk, or "fraud victim") to the account.

Figure 4:
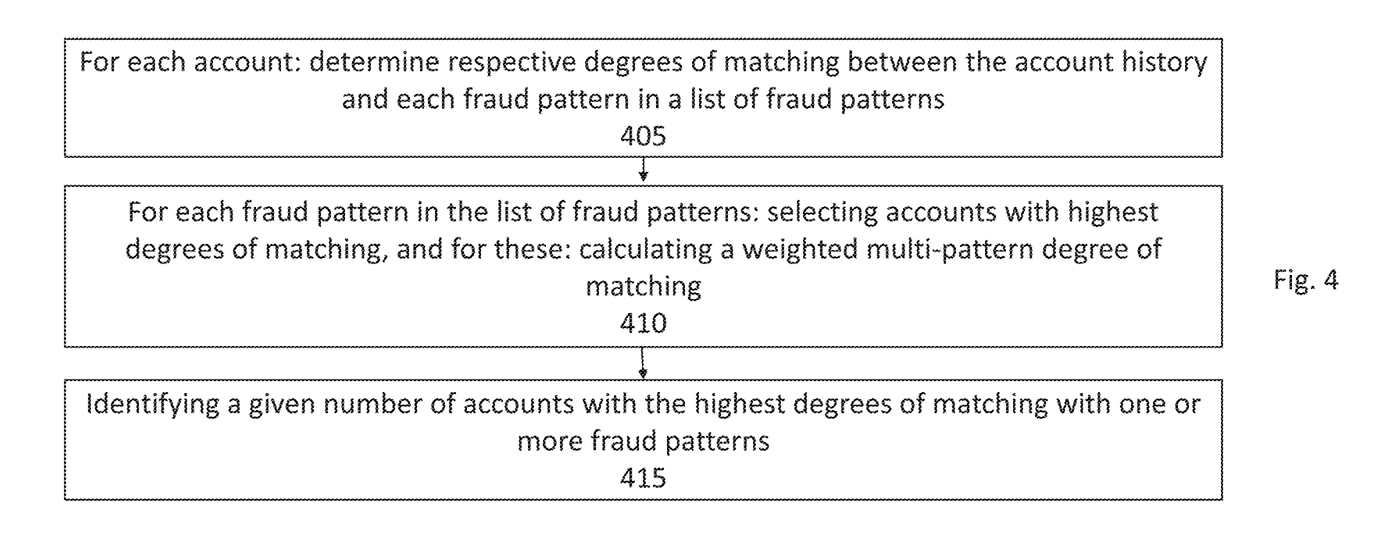
FIG. 4 illustrates a flow diagram of an example method of identifying accounts of a financial institution as suspicious, in accordance with some embodiments of the presently disclosed subject matter.

FIG. 4 illustrates an example method of identifying accounts of a financial institution as suspicious, in accordance with some embodiments of the presently disclosed subject matter.

Processing circuitry 105 (e.g. initial label determination unit 155) can, for each account: determine respective degrees of matching between the account history and each fraud pattern in a list of fraud patterns.

Processing circuitry 105 (e.g. initial label determination unit 155) can, for each fraud pattern in the list of fraud patterns: selecting accounts with highest degrees of matching, and for these: calculating a weighted multi-pattern degree of matching.

Processing circuitry 105 (e.g. initial label determination unit 155) can identify a given number of accounts with the highest degrees of matching with one or more fraud patterns.

Figure 5:
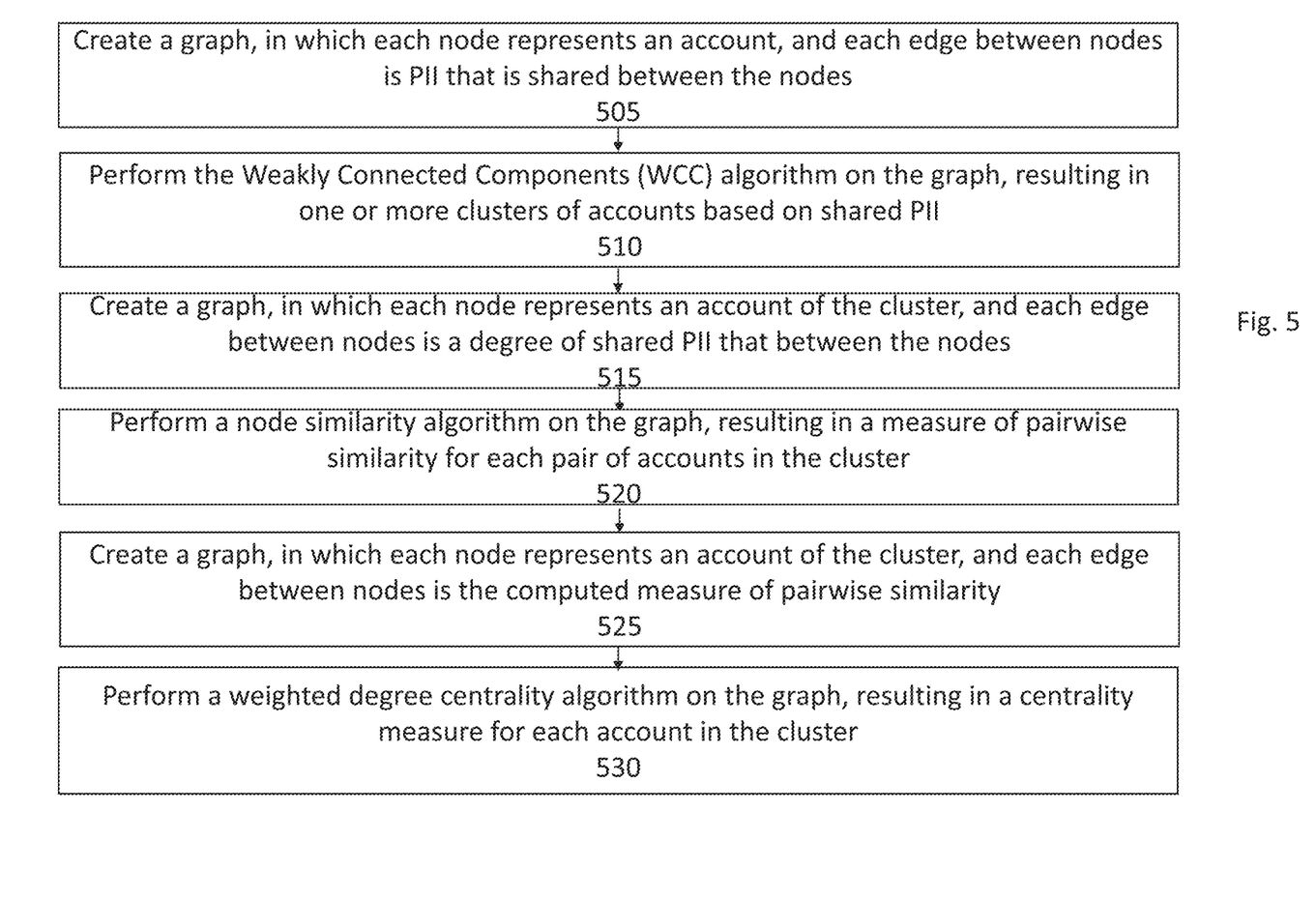
FIG. 5 illustrates a flow diagram of an example method of identifying suspicious accounts with high PII similarity to other suspicious accounts, in accordance with some embodiments of the presently disclosed subject matter.

FIG. 5 illustrates an example method of identifying suspicious accounts with high PII similarity to other suspicious accounts, in accordance with some embodiments of the presently disclosed subject matter.

Processing circuitry 105 (e.g. initial label determination unit 155) can create 505 (or utilize) a graph, in which each node represents an account identified as suspicious, and each edge between nodes is PII that is shared between the nodes. By way of non-limiting example: an edge can be the number of times that a particular shared IMEI was used by either account. There can be a distinct edge for each PII type.

Processing circuitry 105 (e.g. initial label determination unit 155) can next perform 510 the Weakly Connected Components (WCC) algorithm on the graph, resulting in one or more clusters of accounts. Weakly connected components (and other graph algorithms or algorithms mentioned herein without addition detail) are described e.g. in Wikipedia and/or public domain software packages).

It is noted that the accounts within a cluster resulting from WCC need not share PII with each other. For example: account A may share PII with both account B and account C of the same cluster—while account B and C share no PII.

Processing circuitry 105 (e.g. initial label determination unit 155) can next create 515 (or utilize) a graph, in which each node represents an account of the cluster, and each edge between nodes is a degree of shared PII (e.g. as derived from WCC) between the nodes.

Processing circuitry 105 (e.g. initial label determination unit 155) can next perform 520 a node similarity algorithm on the graph, resulting in a measure of pairwise similarity for each pair of accounts in the cluster.

Processing circuitry 105 (e.g. initial label determination unit 155) can next create 525 (or utilize) a graph, in which each node represents an account of the cluster, and each edge between nodes is the computed measure of pairwise similarity.

Processing circuitry 105 (e.g. initial label determination unit 155) can next perform 530 a weighted degree centrality algorithm on the graph, resulting in a measure of centrality for each account in the cluster.

Figure 6:
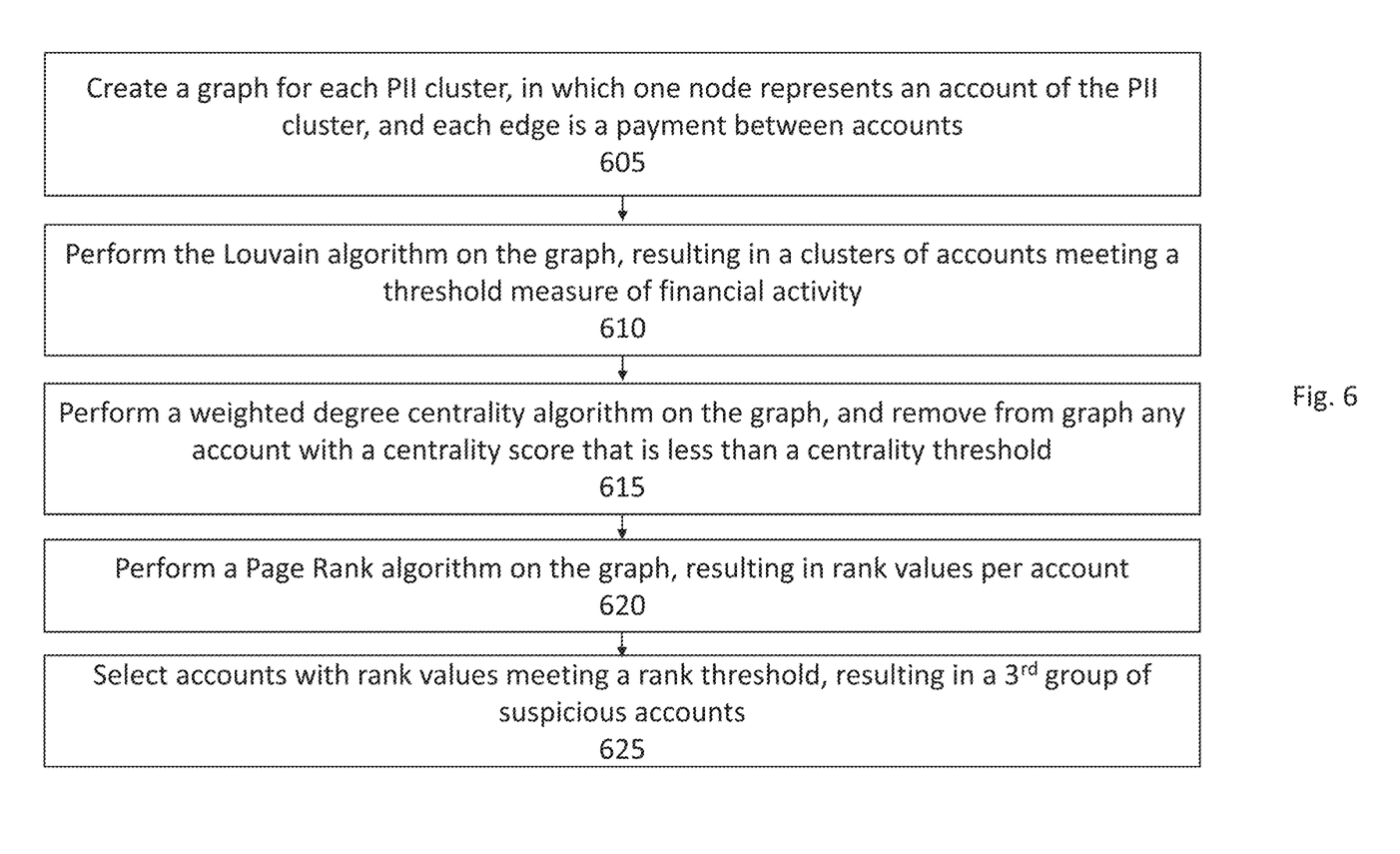
FIG. 6 illustrates a flow diagram of an example method of determining a measure of financial transaction activity among accounts identified as being suspicious and sharing PII, in accordance with some embodiments of the presently disclosed subject matter.

FIG. 6 illustrates an example method of determining a measure of financial transaction activity among accounts identified as being suspicious and sharing PII, in accordance with some embodiments of the presently disclosed subject matter.

Processing circuitry 105 (e.g. initial label determination unit 155) can create 605 (or utilize) a graph, in which each node represents an account of the cluster, and each edge between nodes is a value of a historical payment from one node to the other node.

Processing circuitry 105 (e.g. initial label determination unit 155) can perform 610 a Louvain algorithm on the graph, resulting in clusters of accounts meeting a threshold measure of financial transaction activity.

Processing circuitry 105 (e.g. initial label determination unit 155) can perform 615 a weighted degree centrality algorithm on the graph, thereby resulting in a measure centrality of the account in financial activity among known suspicious accounts. Processing circuitry 105 (e.g. initial label determination unit 155) can eliminate accounts from the cluster if the measure of financial activity with known suspicious accounts meets a threshold.

Processing circuitry 105 (e.g. initial label determination unit 155) can perform a page rank 620 algorithm on the graph, thereby resulting in a ranking of the influence of the account on the basis of financial activity.

Processing circuitry 105 (e.g. initial label determination unit 155) can finally select accounts with rank values meeting a rank threshold, these accounts then constituting the third suspected group.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A processing circuitry-based method of assigning machine learning training labels indicative of a level of risk, to accounts of a financial institution, the method comprising:
   a) identifying a first group of accounts of the financial institution as suspected of fraudulent behavior, based on degrees of matching between:
      i. account history data of each respective account, and
      ii. one or more given fraud patterns;
   b) identifying a second suspected group of accounts, the identifying comprising:
      i. for one or more accounts of the first suspected group of accounts: determining respective degrees of personally identifiable information (PII) similarity between the respective account of the first suspected group of accounts, and other accounts of the first suspected group of accounts, and
      ii. selecting accounts for which the respective determined PII similarity meets a threshold degree of PII similarity;
   c) identifying a third suspected group of accounts, the identifying comprising:
      i. for one or more accounts of the second suspected group of accounts: determining respective degrees of financial transaction activity between the respective account and other accounts of the second suspected group, and
      ii. selecting accounts for which the respective degree of financial transaction activity meets a threshold degree of financial activity;
   d) assigning a machine learning training label indicative of fraud risk to one or more accounts of the third suspected groups of accounts.

2. The method of claim 1, additionally comprising:
   e) for one or more accounts of the accounts of the financial institution:
      i. determining respective degrees of financial transaction activity between the respective account and accounts of the third suspected group of accounts, and
      ii. selecting accounts for which the respective degree of financial transaction activity meets a threshold degree of financial activity,
   thereby giving rise to a group of suspected victim accounts;
   f) for one or more accounts of the group of suspected victim accounts:
      i. determining degrees of matching between:
         account history data of the respective account, and
         one or more given fraud victim patterns; and
      ii. based on the determined respective degrees of matching:
         assigning, to the respective account, a machine learning training label indicative of fraud victim risk.

3. The method of claim 1, wherein the identifying the first group of accounts comprises:
   a) for one or more accounts of the financial institution: determining degrees of matching between:
      i. account history data of the respective account, and
      ii. one or more given fraud patterns;
   b) for each fraud pattern of the one or more given fraud patterns:
      a. selecting a given number of accounts, of the one or more accounts, with highest degrees of matching of the respective fraud pattern,
      b. for each of the selected accounts, compute a weighted multi-pattern degree of matching, based on the determined degrees of matching with the one or more fraud patterns; and
   c) identifying a given number of accounts with highest weighted multipattern degrees of matching as suspected of fraudulent behavior,
the identified accounts with the highest weighted multipattern degrees of matching thereby constituting the first suspected group.

4. The method of claim 1, wherein the identifying the second suspected group of accounts comprises:
   a) utilizing a first graph, wherein:
      i. each node is an account of the first group of accounts, and
      ii. each edge is data indicative of PII shared between accounts associated with the respective edge;
   b) performing a weakly connected components (WCC) algorithm on the first graph, thereby giving rise to one or more clusters of accounts;
   c) for at least one cluster of the one or more clusters:
      i. utilizing a respective second graph, wherein each node is an account of the respective cluster, and each edge is a degree of PII similarity between accounts associated with the respective edge;
      ii. performing a node similarity algorithm on the respective second graph, thereby giving rise to respective measures of pairwise similarity for each pair of accounts in the respective cluster;
      iii. utilizing a respective third graph, wherein each node is an account of the cluster, and each edge is the respective measure of pairwise similarity between accounts associated with the respective edge; and
      iv. performing a weighted degree centrality algorithm on the respective third graph, thereby giving rise to per-account measures of similarity to all other accounts in the respective cluster;
      v. identifying accounts with measures of similarity to all other accounts which meet a similarity measure threshold,
   the identified accounts with measures of similarity to all other accounts which meet a similarity measure threshold thereby constituting the second suspected group.

5. The method of claim 4, wherein the identifying the third suspected group of accounts comprises, for one or more accounts of the second suspected group:
   for at least one cluster of the one or more clusters:

a) utilizing a respective fourth graph, wherein each node is an account of the cluster, and edge is a value of a historical payment between accounts associated with the edge;
b) performing a Louvain algorithm on the respective fourth graph, resulting in one or more clusters of accounts based on financial activity;
c) for one or more of the resulting clusters of accounts based on financial activity, perform a weighted degree centrality algorithm, thereby resulting in, for each account in the cluster based on financial activity, a respective measure of financial transaction activity within the cluster, and
eliminating accounts with measures of financial transaction activity that do not meet a transaction activity threshold;
d) performing a page rank algorithm on the respective fourth graph, thereby resulting in, for each account, a ranking of influence in the cluster based on financial activity,
the accounts with ranking of influence meeting a ranking threshold thereby constituting the third suspected group.

6. A system of assigning machine learning training labels indicative of a level of risk, to accounts of a financial institution, the system comprising a processing circuitry configured to:
a) identify a first group of accounts of the financial institution as suspected of fraudulent behavior, based on degrees of matching between:
i. account history data of each respective account, and
ii. one or more given fraud patterns;
b) identify a second suspected group of accounts, the identifying comprising:
i. for one or more accounts of the first suspected group of accounts: determining respective degrees of personally identifiable information (PII) similarity between the respective account of the first suspected group of accounts, and other accounts of the first suspected group of accounts, and
ii. selecting accounts for which the respective determined PII similarity meets a threshold degree of PII similarity;
c) identify a third suspected group of accounts, the identifying comprising:
i. for one or more accounts of the second suspected group of accounts: determining respective degrees of financial transaction activity between the respective account and other accounts of the second suspected group, and
ii. selecting accounts for which the respective degree of financial transaction activity meets a threshold degree of financial activity;
d) assign a machine learning training label indicative of fraud risk to one or more accounts of the third suspected groups of accounts.

7. A computer program product comprising a computer readable non-transitory storage medium containing program instructions, which program instructions when read by a processor, cause the processing circuitry to perform a method of assigning machine learning training labels indicative of a level of risk, to accounts of a financial institution, the method comprising:
a) identifying a first group of accounts of the financial institution as suspected of fraudulent behavior, based on degrees of matching between:
i. account history data of each respective account, and
ii. one or more given fraud patterns;
b) identifying a second suspected group of accounts, the identifying comprising:
i. for one or more accounts of the first suspected group of accounts: determining respective degrees of personally identifiable information (PII) similarity between the respective account of the first suspected group of accounts, and other accounts of the first suspected group of accounts, and
ii. selecting accounts for which the respective determined PII similarity meets a threshold degree of PII similarity;
c) identifying a third suspected group of accounts, the identifying comprising:
i. for one or more accounts of the second suspected group of accounts: determining respective degrees of financial transaction activity between the respective account and other accounts of the second suspected group, and
ii. selecting accounts for which the respective degree of financial transaction activity meets a threshold degree of financial activity;
d) assigning a machine learning training label indicative of fraud risk to one or more accounts of the third suspected groups of accounts.

* * * * *